(12) United States Patent
Tang et al.

(10) Patent No.: US 10,057,431 B2
(45) Date of Patent: Aug. 21, 2018

(54) CHARGING METHOD, ACCESS NETWORK DEVICE, AND GATEWAY DEVICE

(71) Applicant: Huawei Technologies Co., Ltd., Shenzhen (CN)

(72) Inventors: Binsong Tang, Shenzhen (CN); Tianle Deng, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 14/844,285

(22) Filed: Sep. 3, 2015

(65) Prior Publication Data

US 2015/0381823 A1    Dec. 31, 2015

Related U.S. Application Data

(63) Continuation of application No. PCT/CN2013/072335, filed on Mar. 8, 2013.

(51) Int. Cl.
*H04M 15/00* (2006.01)
*H04L 12/14* (2006.01)
(Continued)

(52) U.S. Cl.
CPC .... *H04M 15/8214* (2013.01); *H04L 12/1403* (2013.01); *H04L 12/1425* (2013.01);
(Continued)

(58) Field of Classification Search
CPC ............. H04M 15/8214; H04L 61/203; H04L 12/1403; H04L 12/1407; H04L 12/1425; H04W 4/24
(Continued)

(56) References Cited

U.S. PATENT DOCUMENTS

2004/0132427 A1    7/2004 Lee et al.
2006/0143098 A1*   6/2006 Lazaridis ............... G06Q 30/04
                                                        705/34
(Continued)

FOREIGN PATENT DOCUMENTS

CN    101998340 A    3/2011
CN    102244580 A    11/2011
CN    102695154 A    9/2012

OTHER PUBLICATIONS

"3rd Generation Partnership Project; Technical Specification Group Services and System Aspects; Telecommunication Management; Charging Management; Wireless Local Area Network (WLAN) Charging (Release 11)," 3 GPP TS 32.252 V11.0.0, Sep. 2012, 47 pages.

*Primary Examiner* — Michael Mapa
(74) *Attorney, Agent, or Firm* — Slater Matsil, LLP (57) ABSTRACT

Embodiments of the present invention relate to a charging method and device. The method includes: obtaining, by a radio access device located in an access network, first information, where the first information includes or is used to indicate a type of service data borne on a radio interface of the radio access device and a type of the radio interface; and sending, by the radio access device, the first information to a charging network element located in a core network, so that the charging network element performs charging by using the first information. The method provided in the embodiments of the present invention can implement service data charging without requiring a wireless local area network access gateway, thereby simplifying a communication process between network elements and reducing management costs of a network.

17 Claims, 4 Drawing Sheets

(51) Int. Cl.
*H04L 29/12* (2006.01)
*H04W 4/24* (2018.01)
(52) U.S. Cl.
CPC ............ *H04L 61/203* (2013.01); *H04W 4/24* (2013.01); *H04L 12/1407* (2013.01)
(58) Field of Classification Search
USPC ................................................ 455/406–408
See application file for complete search history.

(56) References Cited

U.S. PATENT DOCUMENTS

| | | | |
|---|---|---|---|
| 2009/0156213 A1* | 6/2009 | Spinelli ................. | H04W 92/02 455/436 |
| 2010/0208698 A1* | 8/2010 | Lu ..................... | H04W 36/0027 370/331 |
| 2011/0188457 A1* | 8/2011 | Shu ...................... | H04W 28/24 370/329 |
| 2012/0020336 A1* | 1/2012 | Bahr ..................... | H04W 74/02 370/336 |
| 2013/0054428 A1 | 2/2013 | Shaikh | |
| 2013/0316703 A1* | 11/2013 | Girard ................... | G06Q 20/145 455/432.1 |
| 2013/0325700 A1* | 12/2013 | Chakraborty ......... | H04W 12/08 705/39 |
| 2014/0241183 A1* | 8/2014 | Comeau ................ | H04L 5/0098 370/252 |
| 2016/0006883 A1* | 1/2016 | Cartmell ............. | H04L 12/1403 455/408 |

* cited by examiner

CHARGING METHOD, ACCESS NETWORK DEVICE, AND GATEWAY DEVICE

This application is a continuation of International Application No. PCT/CN2013/072335 filed on Mar. 8, 2013, which is incorporated herein by reference in its entirety.

TECHNICAL FIELD

The present invention relates to the field of a communications technology, and in particular, to a charging method, an access network device, and a gateway device.

BACKGROUND

Currently, in a long term evolution (LTE) radio communications network, deploying a wireless fidelity (Wi-Fi) network around a base station has become a mainstream trend of telecom operators. The Wi-Fi network has access features, such as free of charge and a high speed. Therefore, with ongoing increase of mobile Internet data service requirements, the Wi-Fi network will become a priority manner for a user to access the network.

The LTE network does not overlap the Wi-Fi network completely. The LTE can support high-speed data transmission properly to solve an access issue of a user in a high-speed movement scenario, while the Wi-Fi is suitable for low-speed user access and cannot support high-speed movement services. However, when a user keeps using a high-speed data service such as a video and an online game in the LTE network, due to limitation of channels and resources, it is easy to meet an extreme limit of a network capacity. In this case, the Wi-Fi network is integrated into the LTE network, and advantages of the Wi-Fi network will be reflected. Therefore, the Wi-Fi network is a strongest supporter of the LTE network. Both of them bring their respective advantages into full play, and collaborate with each other in high-speed access, low-speed and fixed access scenarios to provide better experience for users.

Figure 1:
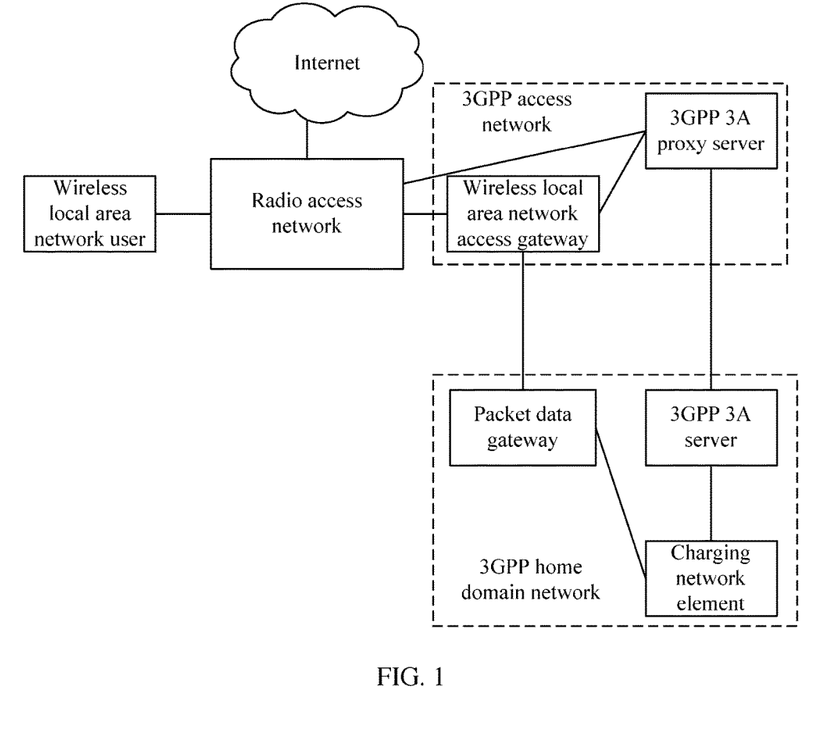
FIG. 1 is a schematic diagram of a type of core network charging provided in the prior art.

Generally, as shown in FIG. 1, when a user terminal is in a non-roaming state, a telecom operator integrates the Wi-Fi-LTE into a core network, and uses a packet data gateway of a home domain network to interact with a charging network element to perform charging. The packet data gateway obtains WLAN packet data of the user terminal from a wireless local area network (WLAN) access gateway, measures a traffic volume of the WLAN packet data of the user terminal, and performs charging by communicating with the charging network element mutually.

Figure 2:
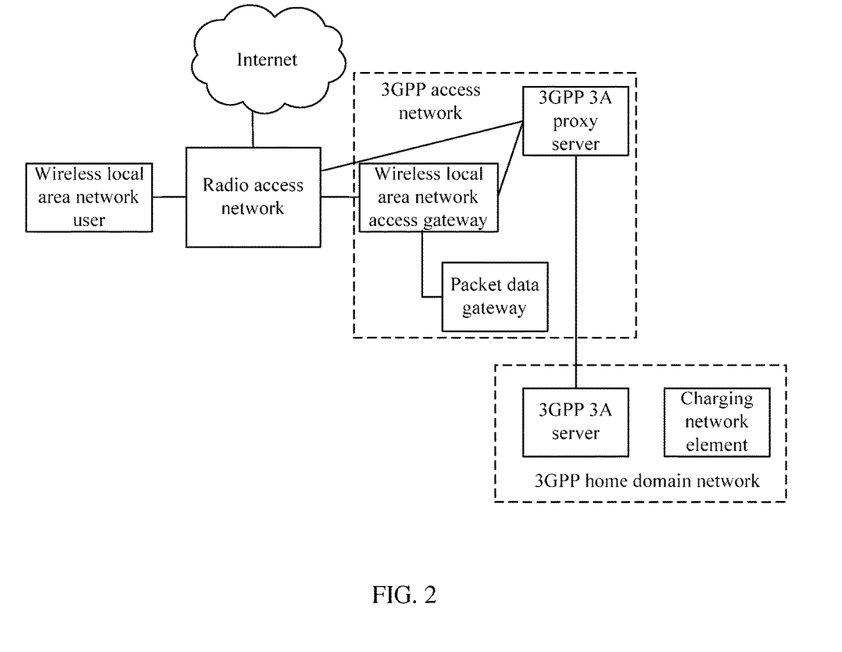
FIG. 2 is a schematic diagram of another type of core network charging provided in the prior art.

As shown in FIG. 2, when the user terminal is in a roaming state, the packet data gateway obtains the WLAN packet data of the user terminal from the WLAN access gateway, measures a traffic volume of the WLAN packet data of the user terminal, and uses an authentication-authorization-accounting (AAA) authentication proxy to transfer a user terminal identifier ID and traffic measurement information to the charging network element through an AAA authentication server of the home domain network, and the charging network element performs charging.

Therefore, the prior art integrates the Wi-Fi-LTE into the core network, which exposes the following defects: Throughout the charging, mutual communication is performed between the wireless local area network access gateway and each network element to ultimately implement the charging. Therefore, control signaling is distributed in each network element in the core network, which leads to a complicated communication process between network elements and increases management costs of the network; and many network elements participate in the communication, which leads to waste of device investment.

SUMMARY

Embodiments of the present invention provide a charging method and device to solve the following problems in the prior art: control signaling is distributed in each network element in a core network, which leads to a complicated communication process between network elements and increases management costs of a network; and, many network elements participate in the communication, which leads to waste of device investment.

According to a first aspect, an embodiment of the present invention provides a charging method, including:

obtaining, by a radio access device located in an access network, first information, where the first information includes or is used to indicate a type of service data borne on a radio interface of the radio access device and a type of the radio interface; and sending, by the radio access device, the first information to a charging network element located in a core network so that the charging network element performs charging by using the first information.

With reference to the first aspect, in a first possible implementation manner of the first aspect, the obtaining, by a radio access device located in an access network, first information includes:

determining, by the radio access device, whether the radio interface bears service data; and if the radio interface bears service data, obtaining, by the radio access device, the first information.

With reference to the first aspect, in a second possible implementation manner of the first aspect, the sending, by the radio access device, the first information to a charging network element located in a core network includes:

forwarding, by the radio access device, the first information to the charging network element through a mobility management entity (MME).

With reference to the first aspect or the first or second possible implementation manner of the first aspect, in a third possible implementation manner, the type of the radio interface specifically includes a wireless fidelity Wi-Fi radio interface type or a long term evolution (LTE) radio interface type.

With reference to the first aspect, or the first, second, or third possible implementation manner of the first aspect, the performing, by the charging network element, charging by using the first information includes:

sending, by the charging network element, the first information to a gateway located in the core network, and receiving traffic information of the service data, where the traffic information is measured by the gateway according to the first information; and performing, by the charging network element, charging according to the traffic information.

According to a second aspect, an embodiment of the present invention provides a charging method, including:

measuring, by a gateway located in a core network according to obtained first information, traffic information of service data borne on a radio interface of a radio access device located in an access network, where the first information includes or is used to indicate a type of service data borne on the radio interface of the radio access device and a type of the radio interface; and sending, by the gateway, the traffic information to a charging network element located in the core network, where the traffic information is used for the charging network element to perform charging.

With reference to the first aspect, in a first possible implementation manner, the measuring, by a gateway located in a core network, a traffic information of service data borne on a radio interface of a radio access device located in an access network includes:

determining, by the gateway, whether the radio interface of the radio access device bears the service data; and if the radio interface bears the service data, obtaining, by the gateway, the first information.

With reference to the second aspect or the first possible implementation manner of the second aspect, in a second possible implementation manner, the type of the radio interface specifically includes a wireless fidelity Wi-Fi radio interface type or a long term evolution (LTE) radio interface type.

According to a third aspect, an embodiment of the present invention provides an access network device, where the access network device is located in an access network, and the access network device includes:

an obtaining unit, configured to obtain first information, where the first information includes or is used to indicate a type of service data borne on a radio interface of the radio access device and a type of the radio interface; and a sending unit, configured to send the first information to a charging network element located in a core network, so that the charging network element performs charging by using the first information.

With reference to the third aspect, in a first possible implementation manner, the obtaining unit is specifically configured to determine whether the radio interface bears service data; and obtain the first information if the radio interface bears service data.

In a second possible implementation manner, the sending unit is specifically configured to send the first information to a mobility management entity (MME), so that the MME forwards the first information to the charging network element for performing charging.

With reference to the third aspect or the first or second possible implementation manner of the third aspect, in a third possible implementation manner, the type of the radio interface, which is obtained by the obtaining unit, specifically includes a wireless fidelity Wi-Fi radio interface type or a long term evolution (LTE) radio interface type.

According to a fourth aspect, an embodiment of the present invention provides a charging gateway device, where the gateway device is located in a core network, and the gateway device includes:

a measuring unit, configured to measure, according to obtained first information, traffic information of service data borne on a radio interface of a radio access device located in an access network, where the first information includes or is used to indicate a type of service data borne on the radio interface of the radio access device and a type of the radio interface; and a sending unit, configured to send the traffic information to a charging network element located in the core network, where the traffic information is used for the charging network element to perform charging.

With reference to the fourth aspect, in a first possible implementation manner, the gateway device further includes a determining unit, configured to determine whether the radio interface of the radio access device bears the service data; and an obtaining unit, configured to obtain the first information when the determining unit determines that the radio interface bears the service data.

With reference to the fourth aspect or the first possible implementation manner of the fourth aspect, in a second possible implementation manner, the type of the radio interface whose traffic is measured by the measuring unit specifically includes a wireless fidelity Wi-Fi radio interface type or a long term evolution (LTE) radio interface type.

Therefore, by applying the charging method and device provided in the embodiments of the present invention, it is not necessary to use a wireless local area network access gateway, and the following problems in a charging process in the prior art are avoided: control signaling is distributed in each network element in a core network, which leads to a complicated communication process between network elements and increases management costs of a network; and many network elements participate in the communication, which leads to waste of device investment. The communication process between network elements is simplified, and management costs of the network are reduced.

DETAILED DESCRIPTION OF ILLUSTRATIVE EMBODIMENTS

To make objectives, technical solutions, and advantages of the present invention clearer, the following describes specific embodiments of the present invention in more detail with reference to accompanying drawings.

Figure 3:
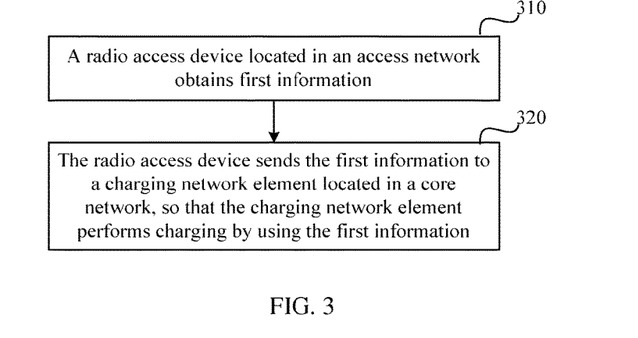
FIG. 3 is a flowchart of a charging method provided in Embodiment 1 of the present invention.

The following uses FIG. 3 as an example to describe a charging method provided in an embodiment of the present invention. The method is applicable to a WIFI-LTE converged network. FIG. 3 is a flowchart of a charging method provided in Embodiment 1 of the present invention. The embodiment of the present invention is implemented by a radio access device, and the radio access device may be an evolved base station or a base station controller. As shown in FIG. 3, this embodiment includes the following steps:

Step 310: A radio access device located in an access network obtains first information, where the first information includes or is used to indicate a type of service data borne on a radio interface of the radio access device and a type of the radio interface.

Specifically, the radio access device in the access network may include multiple radio interfaces. For example, the radio interface may be a wireless fidelity Wi-Fi radio interface or a long term evolution (LTE) radio interface. When a user terminal uses the radio access device to access a network and transmit service data, the radio access device may obtain the first information in a process of interaction between the radio access device and the user terminal, in which the service data is borne. Optionally, the radio access device may further learn, according to an identifier of the user terminal, which terminal performing service data transmission corresponds to the first information.

Optionally, the obtaining, by a radio access device located in an access network, first information includes:

determining, by the radio access device, whether the radio interface bears the service data; and if the radio interface bears the service data, obtaining, by the radio access device, the first information.

Step 320: The radio access device sends the first information to a charging network element located in a core network, so that the charging network element performs charging by using the first information.

Optionally, the performing, by the charging network element, charging by using the first information includes: sending, by the charging network element, the first information to a gateway located in the core network; measuring, by the gateway, traffic information of the service data according to the received first information, and sending the traffic information to the charging network element; and, performing, by the charging network element, charging according to the traffic information.

The radio access device may bear the first information on an S1 interface and send it to the charging network element.

For example, the first information may include a type of service data borne on a radio interface of the radio access device and a type of the radio interface. After receiving the first information, the charging network element may determine, according to the type of service data and the type of the radio interface in the first information, whether charging needs to be performed for the service data borne on the radio interface. If the charging network element determines that charging needs to be performed for the service data borne on the radio interface, the charging network element sends the type of service data or the type of the radio interface corresponding to the service data that needs to be charged in the first information to a gateway in the core network. The gateway measures traffic information of the service data according to the received type of service data or the received type of the radio interface, and sends the traffic information to the charging network element for performing charging.

For another example, the first information may be used to indicate the type of service data borne on the radio interface of the radio access device and the type of the radio interface. For example, the charging network element or the gateway may preset a relationship between the first information, the type of service data borne on the radio interface of the radio access device, and the type of the radio interface. After receiving the first information, the charging network element or the gateway may determine the type of service data and the type of the radio interface according to the relationship between the first information, the type of the service data, and the type of the radio interface, and then the charging network element can determine, according to a traffic volume measured by the gateway for the first information, a traffic volume of the service data borne on the radio interface, and then perform charging. For example, the first information may be S1 interface bearer information, and a relationship between the S1 interface bearer information, the type of the service data, and the type of the radio interface that bears the type of service data is preset on or received by the charging network element or the gateway. The charging network element may receive traffic information of the S1 interface bearer information from the gateway, and calculate, according to the relationship between the S1 interface bearer information, the type of the radio interface, and the type of service data borne on the radio interface, traffic information corresponding to the type of service data borne on the radio interface, and then perform charging.

Therefore, by applying the charging method provided in the embodiment of the present invention, one charging network element is used to perform charging uniformly for a radio interface and service data borne on the radio interface, and it is not necessary to use multiple wireless local area network access gateways, and the following problems in a charging process in the prior art are avoided: control signaling is distributed in each network element in a core network, which leads to a complicated communication process between network elements and increases management costs of a network; and many network elements participate in the communication, which leads to waste of device investment. The communication process between network elements is simplified, and management costs of the network are reduced.

To make objectives, technical solutions, and advantages of the present invention clearer, the following describes specific embodiments of the present invention in more detail with reference to accompanying drawings.

Figure 4:
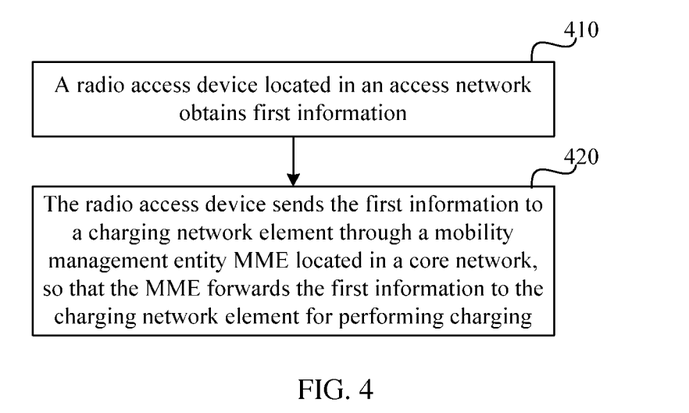
FIG. 4 is a flowchart of a charging method provided in Embodiment 2 of the present invention.

The following uses FIG. 4 as an example to describe a charging method provided in an embodiment of the present invention. FIG. 4 is a flowchart of a charging method provided in Embodiment 2 of the present invention. The embodiment of the present invention, is implemented by a radio access device, and the radio access device may be a base station or a base station controller. As shown in FIG. 4, this embodiment includes the following steps:

Step 410: A radio access device located in an access network obtains first information, where the first information includes or is used to indicate a type of service data borne on a radio interface of the radio access device and a type of the radio interface.

Specifically, the radio access device in the access network includes multiple radio interfaces. For example, the radio interface may be a wireless fidelity Wi-Fi radio interface or a long term evolution (LTE) radio interface. When a user terminal uses the radio access device to access a network side, the radio access device may obtain the first information in a process of creating a service bearer between the radio access device and the user terminal.

Step 420: The radio access device forwards the first information to a charging network element through a mobility management entity (MME) located in a core network.

Specifically, the radio access device sends the first information to the mobility management entity (MME for short) located in the core network, where the first information includes a type of service data borne on a radio interface of the radio access device and a type of the radio interface, which are obtained in step 410.

Further, after receiving the first information, the MME parses out and extracts content of the first information, and is aware that the first information is information sent by the radio access device and related to traffic generated by the user terminal. The MME forwards the first information to the charging network element. After receiving the first information, the charging network element parses out and extracts the type of service data borne on the radio interface of the radio access device and the type of the radio interface, which are included in the first information, and the charging network element forwards the type of service data borne on the radio interface of the radio access device and the type of the radio interface to a gateway in the core network. After receiving the related information sent by the charging network element, the gateway measures a traffic volume of the service data borne on the radio interface of the radio access device, and sends measured traffic information to the charging network element, and the charging network element performs charging according to the traffic information.

Further, in an implementation manner, the first information may specifically be radio bearer information, such as S1 interface bearer information. For example, the type of service data borne on the radio interface of the radio access device is specifically VoIP stream service data, and the radio interface that bears the VoIP stream service data is specifically an LTE radio interface, and therefore, the radio access device carries the type of service data borne on the radio interface of the radio access device and the type of the radio interface in the S1 interface bearer information, and sends service data type information and radio interface information to the charging network element.

Understandably, the foregoing uses examples to describe how the radio access device sends first information of multiple forms to the charging network element. In practical application, it is not limited to that.

Therefore, by applying the charging method provided in the embodiment of the present invention, one charging network element is used to perform charging uniformly for a radio interface and service data borne on the radio interface, and it is not necessary to use multiple wireless local area network access gateways, and the following problems in a charging process in the prior art are avoided: control signaling is distributed in each network element in a core network, which leads to a complicated communication process between network elements and increases management costs of a network; and many network elements participate in the communication, which leads to waste of device investment. The communication process between network elements is simplified, and management costs of the network are reduced.

To make objectives, technical solutions, and advantages of the present invention clearer, the following describes specific embodiments of the present invention in more detail with reference to accompanying drawings.

Figure 5:
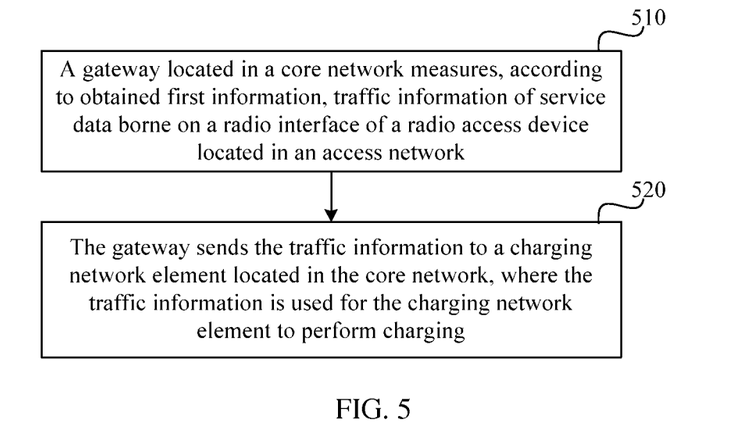
FIG. 5 is a flowchart of a charging method provided in Embodiment 3 of the present invention.

The following uses FIG. 5 as an example to describe a charging method provided in an embodiment of the present invention. FIG. 5 is a flowchart of a charging method provided in Embodiment 3 of the present invention. The embodiment of the present invention is implemented by a gateway located in a core network. As shown in FIG. 5, this embodiment includes the following steps:

Step 510: The gateway located in the core network measures, according to obtained first information, traffic information of service data borne on a radio interface of a radio access device located in an access network, where the first information includes or is used to indicate a type of service data borne on the radio interface of the radio access device and a type of the radio interface.

Specifically, the gateway in the core network communicates with the radio access device over an S1 interface. The radio access device in the access network includes multiple radio interfaces. For example, the radio interface may be a wireless fidelity Wi-Fi radio interface and a long term evolution (LTE) radio interface. When a user terminal accesses a network side by using the radio access device, the gateway may obtain the first information in a process of creating a service data radio bearer or an S1 bearer between the user terminal and the core network; or, in the process of creating the service data radio bearer by using the user terminal, the radio access device may obtain the first information and send the first information to the gateway. According to the obtained first information, the gateway measures traffic information of service data borne on the radio interface of the radio access device.

Further, in an example, a traffic volume of the service data borne on the radio interface of the radio access device, which is measured by the gateway, is 50 M.

Step 520: The gateway sends the traffic information to a charging network element located in the core network, where the traffic information is used for the charging network element to perform charging.

Specifically, after the gateway measures the traffic volume of the service data borne on the radio interface of the radio access device, the traffic volume is carried in the traffic information, and the traffic information is sent to the charging network element located in the core network, where the traffic information is used for the charging network element to perform charging.

It should be noted that the number of gateways in the embodiment of the present invention is 1.

Optionally, the performing, by the gateway located in the core network, measuring to determine whether the radio interface of the radio access device located in the access network bears service data includes:

determining, by the gateway, whether the radio interface of the radio access device bears the service data; and if the radio interface bears the service data, obtaining, by the gateway, the first information.

In the process of creating a service data radio bearer or an S1 bearer between the user terminal and the core network, the gateway may determine whether the radio interface of the radio access device bears service data; if yes, the gateway may obtain the first information in the process of creating the service data radio bearer or the S1 bearer between the user terminal and the core network, or the gateway may receive the first information from the radio access device.

Specifically, after obtaining the type of the service data borne on the radio interface, the gateway determines the type of the radio interface that bears the service data, and obtains the type of the radio interface. For example, the type of the service data borne on the radio interface is VoIP stream service data, and the type of a service interface that bears the VoIP stream service data is an LTE radio interface.

Further, after measuring the traffic information according to the first information, the gateway may send the first information and the traffic information to the charging network element, so that the charging network element can not only perform charging according to the traffic information, but also perform more accurate charging under different radio interface types or different service types according to the type of the radio interface and the type of a service borne on the radio interface, where the type of the radio interface and the type of the service are included in the first information.

Therefore, by applying the charging method provided in the embodiment of the present invention, one charging network element and one gateway corresponding to the charging network element are used to perform charging uniformly for a radio interface and service data borne on the radio interface, and it is not necessary to use multiple wireless local area network access gateways, and the following problems in a charging process in the prior art are avoided: control signaling is distributed in each network element in a core network, which leads to a complicated communication process between network elements and increases management costs of a network; and many network elements participate in the communication, which leads to waste of device investment. The communication process between network elements is simplified, and management costs of the network are reduced.

Figure 6:
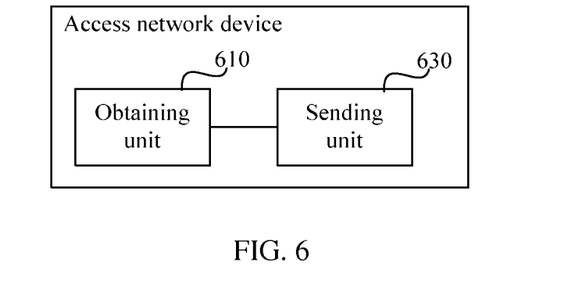
FIG. 6 is a schematic diagram of an access network device provided in Embodiment 4 of the present invention.

Correspondingly, Embodiment 4 of the present invention further provides an access network device to implement charging methods in Embodiment 1 and Embodiment 2. As shown in FIG. 6, the access network device is located in an access network, and the access network device includes an obtaining unit 610 and a sending unit 620.

The obtaining unit 610 in the access network device is configured to obtain first information, where the first information includes or is used to indicate a type of service data borne on a radio interface of the radio access device and a type of the radio interface.

The sending unit 620 is configured to send the first information to a charging network element located in a core network, so that the charging network element performs charging by using the first information.

Optionally, the obtaining unit 610 is specifically configured to determine whether the radio interface bears service data; and obtain the first information if the radio interface bears service data.

The sending unit 620 is specifically configured to send the first information to a mobility management entity (MME) located in a core network, so that the MME forwards the first information to the charging network element for performing charging.

The type of the radio interface, which is obtained by the obtaining unit 610, specifically includes a wireless fidelity Wi-Fi radio interface type or a long term evolution (LTE) radio interface type.

The access network device provided in the embodiment of the present invention may be a radio access device such as a base station or a base station controller.

The access network device provided in the embodiment of the present invention can implement actions of the radio access device in the foregoing method embodiment. For similar description of the actions, this embodiment gives no repeated description.

Therefore, by applying the access network device provided in the embodiment of the present invention, it may be not necessary to use a wireless local area network access gateway, and the following problems in a charging process in the prior art are avoided: control signaling is distributed in each network element in a core network, which leads to a complicated communication process between network elements and increases management costs of a network; and many network elements participate in the communication, which leads to waste of device investment. The communication process between network elements is simplified, and management costs of the network are reduced.

Figure 7:
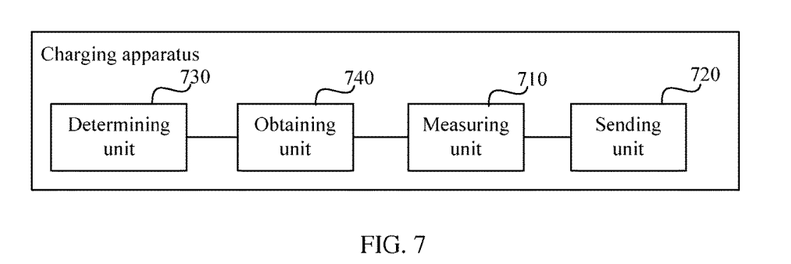
FIG. 7 is a schematic diagram of a gateway device provided in Embodiment 5 of the present invention.

Correspondingly, Embodiment 5 of the present invention further provides a gateway device to implement charging methods in Embodiment 3. As shown in FIG. 7, the gateway device is located in a core network, and the gateway device includes a measuring unit 710 and a sending unit 720.

The measuring unit 710 in the gateway device is configured to measure, according to obtained first information, traffic information of service data borne on a radio interface of a radio access device located in an access network, where the first information includes or is used to indicate a type of service data borne on the radio interface of the radio access device and a type of the radio interface.

The sending unit 720 is configured to send the traffic information to a charging network element located in the core network, where the traffic information is used for the charging network element to perform charging.

The gateway device further includes a determining unit 730, configured to determine whether the radio interface of the radio access device bears the service data; and an obtaining unit 740, configured to obtain the first information when the determining unit 730 determines that the radio interface bears the service data.

Optionally, the type of the radio interface whose traffic is measured by the measuring unit 710 specifically includes a wireless fidelity Wi-Fi radio interface type or a long term evolution (LTE) radio interface type.

The gateway device provided in this embodiment may be a gateway in a core network, and the gateway device provided in this embodiment can implement actions performed by a gateway in a core network in the foregoing method embodiment. For similar concepts and processes, this embodiment gives no repeated description.

Therefore, by applying the gateway device provided in the embodiment of the present invention, the same charging network element and the gateway corresponding to the charging network element are used, and no wireless local area network access gateway is required, and the following problems in a charging process in the prior art are avoided: control signaling is distributed in each network element in a core network, which leads to a complicated communication process between network elements and increases management costs of a network; and many network elements participate in the communication, which leads to waste of device investment. The communication process between network elements is simplified, and management costs of the network are reduced.

Figure 8:
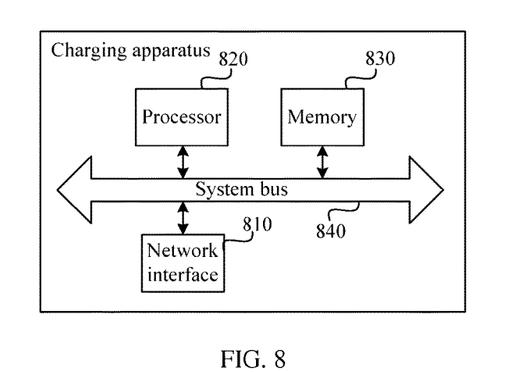
FIG. 8 is a structural diagram of access network device hardware provided in an embodiment of the present invention.

In addition, the access network device provided in Embodiment 4 of the present invention may further employ the following implementation manner to implement charging methods in Embodiment 1 and Embodiment 2 of the present invention. As shown in FIG. 8, the access network device is located in an access network, and the access network device includes a network interface 810, a processor 820, and a memory 830. A system bus 840 is configured to connect the network interface 810, the processor 820, and the memory 830.

The network interface 810 is configured to communicate with a user terminal, or a gateway located in a core network.

The memory 830 may be a permanent memory such as a hard disk drive and a flash memory, and the memory 830 includes a software module and a device driver. The software module may be any function module capable of implementing the foregoing method of the present invention; and the device driver may be a network and interface driver.

At the time of startup, the software components are loaded into the memory 830 and then accessed by the processor 820, and the following instructions are executed:

obtaining, by a radio access device located in an access network, first information, where the first information includes or is used to indicate a type of service data borne on a radio interface of the radio access device and a type of the radio interface; and sending, by the radio access device, the first information to a charging network element located in a core network, so that the charging network element performs charging by using the first information.

Optionally, in the foregoing instructions, the obtaining, by a radio access device located in an access network, first information includes:

determining, by the radio access device, whether the radio interface bears service data; and if the radio interface bears service data, obtaining, by the radio access device, the first information.

Optionally, the sending, by the radio access device, the first information to a charging network element located in a core network includes:

forwarding, by the radio access device, the first information to the charging network element through a mobility management entity (MME).

Optionally, the type of the radio interface specifically includes a wireless fidelity Wi-Fi radio interface type or a long term evolution (LTE) radio interface type.

The access network device may be a radio access device in the method embodiment, and may specifically be a base station or a base station controller.

The access network device may implement actions performed by the radio access device in the method embodiment. For similar concepts and processes, this embodiment gives no repeated description.

Figure 9:
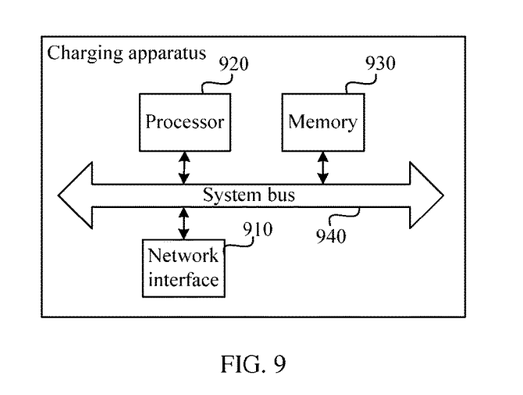
FIG. 9 is a structural diagram of gateway device hardware provided in an embodiment of the present invention.

Therefore, by applying the access network device provided in the embodiment of the present invention, it is not necessary to use a wireless local area network access gateway, and the following problems in a charging process in the prior art are avoided: control signaling is distributed in each network element in a core network, which leads to a complicated communication process between network elements and increases management costs of a network; and many network elements participate in the communication, which leads to waste of device investment. The communication process between network elements is simplified, and management costs of the network are reduced. In addition, the gateway device provided in Embodiment 5 of the present invention may employ the following implementation manner to implement the charging method in Embodiment 3 of the present invention. As shown in FIG. 9, the gateway device is located in a core network, and the gateway device includes a network interface 910, a processor 920, and a memory 930. A system bus 940 is used to connect the network interface 910, the processor 920, and the memory 930.

The network interface 910 is configured to communicate with a radio access device in an access network.

The memory 930 may be a permanent memory such as a hard disk drive and a flash memory, and the memory 930 includes a software module and a device driver. The software module may be any function module capable of implementing the foregoing method of the present invention; and the device driver may be a network and interface driver.

At the time of startup, the software components are loaded into the memory 930 and then accessed by the processor 920, and the following instructions are executed:

measuring, by a gateway located in a core network according to obtained first information, traffic information of service data borne on a radio interface of a radio access device located in an access network, where the first information includes or is used to indicate a type of service data borne on the radio interface of the radio access device and a type of the radio interface; and sending, by the gateway, the traffic information to a charging network element located in the core network, where the traffic information is used for the charging network element to perform charging.

Optionally, the measuring, by a gateway located in a core network, a traffic information of service data borne on a radio interface of a radio access device located in an access network includes:

determining, by the gateway, whether the radio interface of the radio access device bears the service data; and if the radio interface bears the service data, obtaining, by the gateway, the first information.

Optionally, the type of the radio interface specifically includes a wireless fidelity Wi-Fi radio interface type or a long term evolution (LTE) radio interface type.

The gateway device provided in this embodiment may be the gateway in the method embodiment, and may implement actions performed by the gateway in the method embodiment. For similar concepts and processes, this embodiment gives no repeated description.

Therefore, by applying the gateway device provided in the embodiment of the present invention, the same charging network element and the same gateway corresponding to the charging network element are used to perform charging for service data borne on a radio interface, and it is not necessary to use a radio access network gateway, and the following problems in a charging process in the prior art are avoided: control signaling is distributed in each network element in a core network, which leads to a complicated communication process between network elements and increases management costs of a network; and many network elements participate in the communication, which leads to waste of device investment. The communication process between network elements is simplified, and management costs of the network are reduced.

A person skilled in the art may be further aware that, with reference to the examples described in the embodiments disclosed in this specification, units and algorithm steps may be implemented by electronic hardware, computer software, or a combination thereof. In order to clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

The steps of a method or an algorithm described with reference to the embodiments disclosed herein may be implemented by hardware or by a software module executed by a processor, or by a combination thereof. The software module may reside in a random access memory (RAM), an internal memory, a read-only memory (ROM), an electrically programmable ROM, an electrically erasable programmable ROM, a register, a hard disk, a removable disk, a CD-ROM, or any storage medium of another form known in the art.

The specific implementation manners described above have described objectives, technical solutions, and beneficial effects of the present invention in more detail. Understandably, the foregoing descriptions are merely specific implementation manners of the present invention, but are not intended to limit the protection scope of the present invention. Any modifications, equivalent substitutions, and improvements made within the spirit and principles of the present invention shall fall within the protection scope of the present invention.

What is claimed is:

1. A charging method, comprising:
   determining, by a radio access device that has multiple radio interfaces and that is located in an access network and during a process of creating a service data radio bearer by the radio access device between the radio access device and a user terminal, that a radio interface of the radio access device of the multiple radio interfaces bears service data;
   obtaining first information by the radio access device during the process of creating the service data radio bearer and as a result of determining that the radio interface bears the service data, wherein the first information comprises $S_1$ bearer information and indicates a type of service data borne on the radio interface and a type of the radio interface, wherein the first information indicates that the radio interface is one of a Wi-Fi interface or a cellular interface; and
   sending, by the radio access device, the first information to a charging network element located in a core network, the sending the first information to the charging network causing the charging network element to perform charging in accordance with a relationship between the first information, the type of the service data, and the type of the radio interface, and further in accordance with the charging network element determining that charging needs to be performed for the service data borne on the radio interface, wherein the charging network element performing charging comprises sending command information to a gateway configured to measure traffic according to the type of the radio interface for data sent over the Wi-Fi interface and for data sent over the cellular interface, the command information including the first information and causing the gateway to measure traffic volume of the service data borne on the radio interface according to the type of the radio interface, and wherein the charging network element performing charging comprises receiving, by the charging network element from the gateway, after the gateway measures the traffic volume of the service data, the first information and traffic information of the service data measured by the gateway according to the first information.

2. The charging method according to claim 1, wherein the sending the first information to a charging network element comprises:
   forwarding, by the radio access device, the first information to the charging network element through a mobility management entity (MME).

3. The charging method according to claim 1, wherein the type of the radio interface is at least one of a Wi-Fi radio interface type or a long term evolution (LTE) radio interface type.

4. The charging method according to claim 1, wherein the charging network element performing the charging further comprises:
   performing, by the charging network element, charging according to the traffic information.

5. The charging method according to claim 1, wherein the charging network element treats the service data borne on the radio interface as free of charge in response to the charging network element determining that charging does not need to be performed for the service data borne on the radio interface.

6. A charging method, comprising:
   receiving, by a gateway located in a core network, command information comprising first information, wherein the first information comprises $S_1$ bearer information and is obtained from creation of a service data radio bearer by a radio access device between the radio access device having multiple radio interfaces and a user terminal, wherein the command information is sent by a charging network element located in the core network in response to the charging network element determining that charging needs to be performed for service data borne on a radio interface of the multiple radio interfaces, wherein the gateway is configured to measure traffic according to a type of the radio interface for data sent over a Wi-Fi interface and for data sent over a cellular interface, wherein the radio access device comprises the radio interface, and wherein the command information causes the gateway to measure traffic volume of the service data borne on the radio interface according to the type of the radio interface;
   measuring, according to the first information, traffic information of service data borne on a radio interface of the radio access device located in an access network, wherein the first information comprises first data indicating a type of the service data borne on the radio interface of the radio access device and the type of the radio interface, wherein the first data indicates that the radio interface is one of the Wi-Fi interface or the cellular interface; and
   sending, by the gateway, the traffic information and the first information to the charging network element after the gateway measures the traffic volume of the service data, wherein the traffic information and the first information is used by the charging network element to perform charging in accordance with a relationship between the first information, the type of the service data, and the type of the radio interface.

7. The charging method according to claim 6, wherein the measuring the traffic information of the service data borne on the radio interface comprises:
   determining, by the gateway, that the radio interface of the radio access device bears the service data; and
   obtaining, by the gateway and as a result of determining that the radio interface bearing the service data, the first information.

8. The charging method according to claim 6, wherein the type of the radio interface is at least one of a Wi-Fi radio interface type or a long term evolution (LTE) radio interface type.

9. The charging method according to claim 6, wherein the charging network element treats the service data borne on the radio interface as free of charge in response to the charging network element determining that charging does not need to be performed for the service data borne on the radio interface.

10. An access network device, wherein the device is located in an access network, and the device comprises:
    multiple radio interfaces;
    a processor; and
    a non-transitory computer readable medium connected to the processor and having stored thereon instructions that, when executed, cause the processor to:
       determine, during a process of creating a service data radio bearer by the access network device between the access network device and a user terminal, that a radio interface of the multiple radio interfaces of the access network device bears service data,
       obtain first information during the process of creating the service data radio bearer and as a result of determining that the radio interface bears the service data, wherein the first information comprises $S_1$ bearer information and indicates a type of the service data borne on the radio interface of the access network device a type of the radio interface, wherein the first information indicates that the radio interface is one of a Wi-Fi interface or a cellular interface, and send the first information to a charging network element located in a core network, the sending the first information to the charging network causing the charging network element to perform charging according a relationship between the first information, the type of the service data, and the type of the radio interface, and further in response to the charging network element determining that charging needs to be performed for the service data borne on the radio interface, wherein the charging network element performing charging comprises sending command information, including the first information, to a gateway configured to measure traffic according to the type of the radio interface for data sent over the Wi-Fi interface and for data sent over the cellular interface, the command information causing the gateway to measure traffic volume of the service data borne on the radio interface according to the type of the radio interface, and wherein the charging network element performing charging comprises receiving, by the charging network element from the gateway, after the gateway measures the traffic volume of the service data, the first information and traffic information of the service data measured by the gateway according to the first information.

11. The access network device according to claim 9, wherein the instructions causing the processor to send the first information to a charging network element comprise instructions that, when executed, cause the processor to:

send the first information to a mobility management entity (MME), so that the MME forwards the first information to the charging network element for performing the charging.

12. The access network device according to claim 9, wherein the type of the radio interface is at least one of a Wi-Fi radio interface type or a long term evolution (LTE) radio interface type.

13. The access network device according to claim 10, wherein the charging network element treats the service data borne on the radio interface as free of charge in response to the charging network element determining that charging does not need to be performed for the service data borne on the radio interface.

14. A gateway device, wherein the device is located in a core network, and the device comprises:

a processor; and a non-transitory computer readable medium connected to the processor and having stored thereon instructions that, when executed, cause the processor to:

receive command information comprising first information, wherein the first information comprises $S_1$ bearer information and is obtained from creation of a service data radio bearer by a radio access device that has multiple radio interfaces and that is between the radio access device and a user terminal, wherein the command information is sent by a charging network element located in the core network in response to the charging network element determining that charging needs to be performed for service data borne on a radio interface of the multiple radio interfaces, wherein the gateway device is configured to measure traffic according to a type of the radio interface for data sent over a Wi-Fi interface and for data sent over a cellular interface, wherein the radio access device comprises the radio interface, and wherein the command information causes the gateway device to measure traffic volume of the service data borne on the radio interface according to the type of the radio interface;

measure, according to the first information, traffic information of service data borne on a radio interface of the radio access device located in an access network, wherein the first information comprises first data indicating a type of the service data borne on the radio interface of the radio access device and a type of the radio interface, wherein the first data indicates that the radio interface is one of a Wi-Fi interface or a cellular interface; and send the traffic information and the first information to a charging network element located in the core network after the gateway device measures the traffic volume of the service data, wherein the traffic information and the first information are used by the charging network element to perform charging in accordance with a relationship between the first information, the type of the service data, and the type of the radio interface.

15. The gateway device according to claim 14, wherein the non-transitory computer readable medium further has stored thereon instructions that, when executed, cause the processor to:

determine that the radio interface of the radio access device bears the service data; and obtain the first information as a result of determining that the radio interface bears the service data.

16. The gateway device according to claim 14, wherein the type of the radio interface is at least one of a Wi-Fi radio interface type or a long term evolution (LTE) radio interface type.

17. The gateway device according to claim 14, wherein the charging network element treats the service data borne on the radio interface as free of charge in response to the charging network element determining that charging does not need to be performed for the service data borne on the radio interface.

* * * * *

UNITED STATES PATENT AND TRADEMARK OFFICE
CERTIFICATE OF CORRECTION

PATENT NO. : 10,057,431 B2  
APPLICATION NO. : 14/844285  
DATED : August 21, 2018  
INVENTOR(S) : Binsong Tang et al.

It is certified that error appears in the above-identified patent and that said Letters Patent is hereby corrected as shown below:

In the Claims

In Column 15, Line 33, Claim 11, delete "claim 9" and insert --claim 10--.

In Column 15, Line 41, Claim 12, delete "claim 9" and insert --claim 10--.

Signed and Sealed this  
Thirtieth Day of October, 2018

Andrei Iancu  
*Director of the United States Patent and Trademark Office*